(12) United States Patent
Shimizu et al.

(10) Patent No.: US 6,470,994 B1
(45) Date of Patent: Oct. 29, 2002

(54) ELECTRIC POWER STEERING APPARATUS

(75) Inventors: Yasuo Shimizu; Shigenori Takimoto, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/145,473

(22) Filed: Sep. 2, 1998

(30) Foreign Application Priority Data

Sep. 3, 1997 (JP) .............................................. 9-238737

(51) Int. Cl.[7] .................................................. B62D 5/04
(52) U.S. Cl. .......................................... 180/446; 701/41
(58) Field of Search ................................. 180/446, 443, 180/444; 701/41, 42

(56) References Cited

U.S. PATENT DOCUMENTS

| | | | | |
|---|---|---|---|---|
| 4,688,655 A | * | 8/1987 | Shimizu et al. | 180/79.1 |
| 4,708,220 A | * | 11/1987 | Noto et al. | 180/142 |
| 4,800,975 A | * | 1/1989 | Oshita et al. | 180/142 |
| 4,837,692 A | * | 6/1989 | Shimizu | 364/424.05 |
| 5,040,629 A | * | 8/1991 | Takeshima et al. | 180/79.1 |
| 5,444,622 A | * | 8/1995 | Takeshima et al. | 364/424.05 |
| 5,457,632 A | * | 10/1995 | Tagawa et al. | 364/424.05 |
| 5,481,457 A | * | 1/1996 | Yamamoto et al. | 346/424.05 |
| 5,528,497 A | * | 6/1996 | Yamamoto et al. | 363/424.05 |
| 5,596,252 A | * | 1/1997 | Shimizu et al. | 318/432 |
| 5,668,722 A | * | 9/1997 | Kaufmann et al. | 701/41 |
| 5,704,446 A | * | 1/1998 | Chandy et al. | 180/446 |
| 5,709,281 A | * | 1/1998 | Sherwin et al. | 180/272 |
| 5,740,040 A | * | 4/1998 | Kifuku et al. | 364/424.051 |
| 5,774,819 A | * | 6/1998 | Yamamoto et al. | 701/41 |
| 5,828,972 A | * | 10/1998 | Asanuma et al. | 701/41 |
| 5,845,222 A | * | 12/1998 | Yamamoto et al. | 701/41 |
| 5,881,836 A | * | 3/1999 | Nishimoto et al. | 180/446 |
| 5,984,042 A | * | 11/1999 | Nishimoto et al. | 180/446 |

FOREIGN PATENT DOCUMENTS

| | | | |
|---|---|---|---|
| JP | 5-105100 | * | 4/1993 |
| JP | 7-323852 | | 12/1995 |
| JP | 8-40293 | * | 2/1996 |
| JP | 8-104249 | * | 4/1996 |

* cited by examiner

*Primary Examiner*—Robert P. Olszewski
*Assistant Examiner*—Andrew J. Fischer
(74) *Attorney, Agent, or Firm*—Merchant & Gould, P.C.

(57) ABSTRACT

An electric power steering apparatus having a variable ratio steering gear mechanism includes an electric motor for applying a steering assist torque to the steering system of a vehicle, a control unit for controlling operation of the electric motor on the basis of at least a steering torque of the steering system, and a motor drive unit for driving the motor on the basis of an output signal from the control unit. The control unit includes a steering torque calculating part for outputting a steering torque component corresponding to the steering torque, and a vehicle behavior calculating part for outputting a behavior component corresponding to a vehicle behavior. The control unit corrects the steering torque component by damping it with the behavior component.

1 Claim, 11 Drawing Sheets

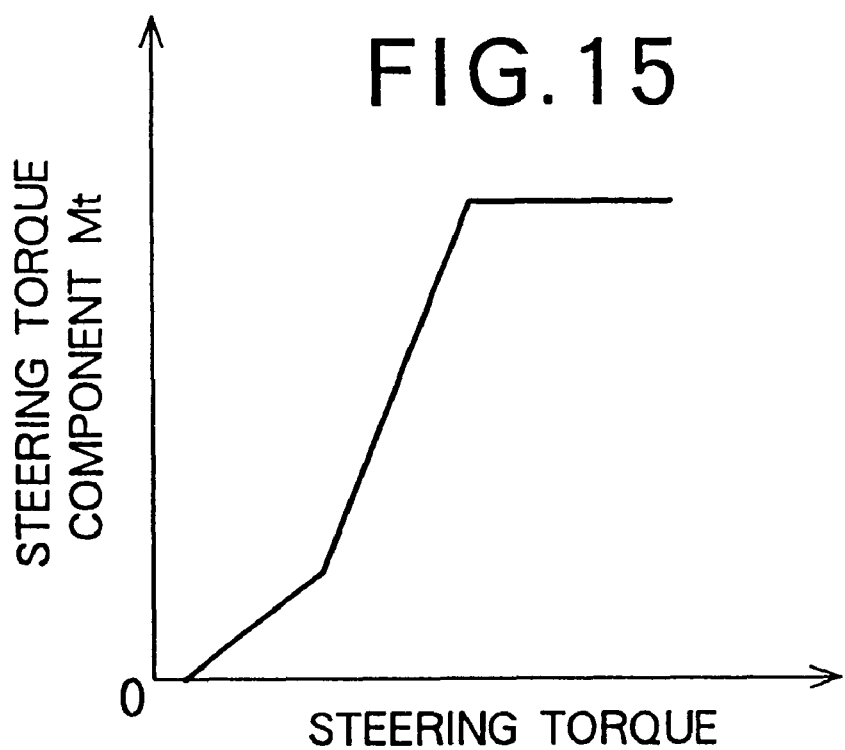
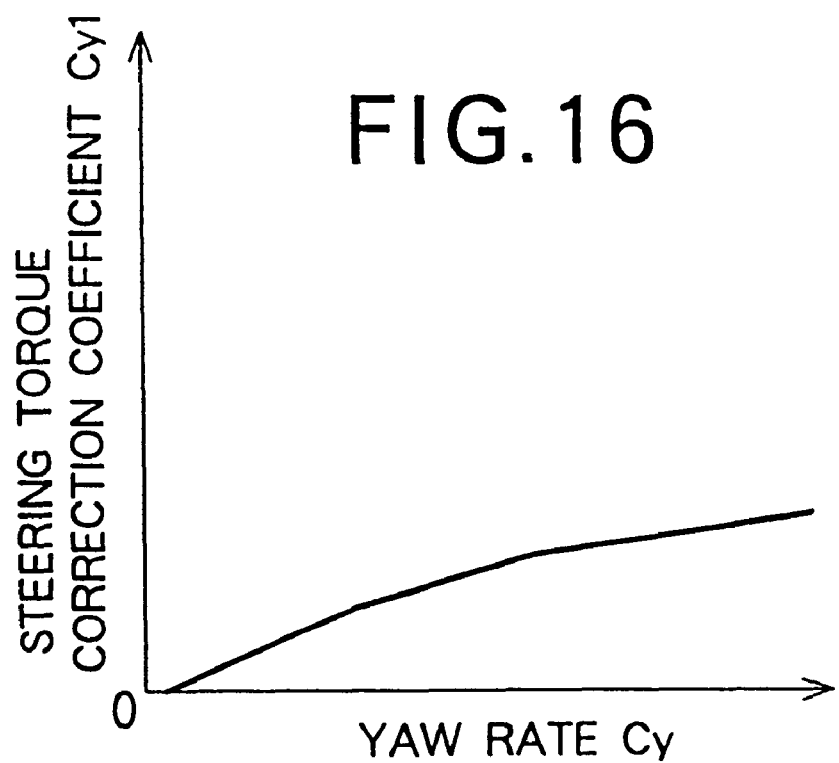

ELECTRIC POWER STEERING APPARATUS

BACKGROUND OF THE INVENTION

1. Field of the Invention

The present invention relates to improvements in an electric power steering apparatus for applying power from an electric motor to the steering system of a vehicle to lighten the manual steering effort of the driver, and more particularly to an electric power steering apparatus having a variable ratio steering gear mechanism.

2. Description of the Related Art

Electric power steering apparatuses with a variable ratio steering gear mechanism are known in which the steering gear ratio is designed to gradually decrease with an angle of rotation of the steering wheel in a direction from the straight ahead (neutral) position toward a left or a right end (steering lock) position of the steering wheel. The variable steering gear ratio provides a small lock-to-lock steering angle and prevents excessively high sensitivity or response to the driver's manual steering operation while the vehicle is running straight. An electric motor is assembled with the variable ratio steering gear mechanism to supply the latter with an assist torque corresponding to the steering torque so as not to increase the steering torque.

Some known electric power steering apparatuses have a gear-ratio characteristic which is responsive to the vehicle velocity. In this case, the steering gear ratio gradually decreases with an angle of rotation of the steering wheel from the straight ahead position toward the left or right steering lock position.

Because of the steering gear ratio gradually decreasing with an increase in the angle of rotation of the steering wheel, application of the steering assist torque from the electric motor in correspondence to the steering torque or in response to the vehicle velocity will cause the problem as described below.

The electric power steering apparatuses with variable ratio steering gear mechanism, when the steering wheel is steered or turned at the same speed as conventional electric steering apparatus with a constant ratio steering gear mechanism, tends to cause over-steering of the front wheels because the steering torque (steering counter force) does not increase so much as the steering angle increases. If a quick steering operation is taken by the driver to correct the oversteer, smooth maneuvers of the vehicle cannot be achieved.

The foregoing problem may be overcome by controlling the apparatus in such a way to apply a steering counter force in response to the steering speed, however, such control will hinder high-speed handling of the steering wheel.

SUMMARY OF THE INVENTION

It is accordingly an object of the present invention to provide an electric power steering apparatus which is able to diminish the difference or lag between the driver's steering operation and the vehicle behavioral response, insures smooth maneuvers of the vehicle, and can apply a steering counter force which enables the driver to steer or turn the steering wheel at high speeds without causing oversteer of the front wheels.

According to the present invention, there is provided an electric power steering apparatus including a variable ratio steering gear mechanism, comprising: an electric motor for applying a steering assist torque to a steering system of the vehicle; a steering torque sensor for detecting a steering torque of the steering system and generating a steering torque signal corresponding to the detected steering torque; a behavior sensor for detecting a behavior of the vehicle and generating a behavior signal corresponding to the detected vehicle behavior; a control unit for controlling operation of the electric motor on the basis of at least the steering torque, the control unit including a steering torque calculating part for outputting a steering torque component corresponding to the steering torque signal output from the steering torque sensor, and a vehicle behavior calculating part for outputting a behavior component corresponding to the behavior signal output from the behavior sensor, the control unit correcting the steering torque component by damping it with the behavior component; and a motor drive unit for driving the motor on the basis of an output signal from the control unit.

Even when the steering wheel is turned at the same speed as the conventional electric power steering apparatus, the vehicle behavior available for the driver as a steering counter force prevents front wheels of the vehicle from becoming over-steered and can diminish the difference or lag between the driver's manual steering operation and the vehicle behavioral response.

The control unit may further include a vehicle behavioral change rate calculating part for outputting a change rate component corresponding to the rate of change of an output signal from the vehicle behavior calculating part. The control unit further corrects the steering torque component by subtracting the change rate component from the steering torque component.

In one preferred form, the electric power steering apparatus further includes a vehicle velocity sensor for detecting a velocity of the vehicle and generating a vehicle velocity signal corresponding to the detected velocity of the vehicle. The control unit further includes a vehicle velocity calculating part for outputting a vehicle velocity component corresponding to the vehicle velocity signal output from the vehicle velocity sensor, and a steering condition detecting section for detecting a forward state and a return state of the steering system. The control unit corrects the steering torque component by subtracting from the steering torque component a first value determined on the basis of the behavior component and the vehicle velocity component when the forward state is detected by the steering condition detecting section and by adding the steering torque component and a second value determined on the basis of the behavior component and the vehicle velocity component when the return state is detected by the steering condition detecting section.

The steering counter force is well adapted to the sensitivity of the vehicle behavior which is variable with the vehicle speed (the sensitivity is low at low vehicle speeds and high at high vehicle speeds). Accordingly, the steering operation is achieved smoothly throughout the prescribed speed range without creating a great lag between the driver's manual steering effort and the vehicle behavioral response.

In another preferred form, the electric power steering apparatus further includes a vehicle velocity sensor for detecting a velocity of the vehicle and generating a vehicle velocity signal corresponding to the detected velocity of the vehicle, and the control unit further includes a vehicle behavioral change rate calculating part for outputting a change rate component corresponding to the rate of change of an output signal from the vehicle behavior calculating part, a vehicle velocity calculating part for outputting a vehicle velocity component corresponding to the vehicle velocity signal output from the vehicle velocity sensor, and a steering condition detecting section for detecting a forward state and a return state of the steering system. The control unit, when the forward state is detected by the steering condition detecting section, corrects the steering torque component by first subtracting from the steering torque component a first value determined on the basis of the behavior component and the vehicle velocity component and further subtracting from the resulting remainder of the first subtraction a second value determined on the basis of the change rate component and the vehicle velocity component. When the return state is detected by the steering condition detecting section, the control unit corrects the steering torque component by adding the steering torque component and a third value determined on the basis of the behavior component and the vehicle velocity component, and further subtracting from the resulting sum of the addition a forth value determined on the basis of the change rate component and the vehicle velocity component. Since the steering counter force is also responsive to the vehicle behavioral change rate, the lag between the driver's steering operation and the vehicle behavioral response is smoothed.

The above and other objects, features and advantages of the present invention will become apparent to those versed in the art upon making reference to the following description and accompanying sheets of drawings in which certain preferred structural embodiments of the present invention are described by way of illustrative examples.

BRIEF DESCRIPTION OF THE DRAWINGS

FIG. 15 is a data table showing a correspondence between the steering torque and the steering torque component; and FIG. 16 is a data table showing a correspondence between the yaw rate and the steering torque correction coefficient.

DETAILED DESCRIPTION OF THE PREFERRED EMBODIMENTS

Certain preferred embodiments of the present invention will be described in greater detail with reference to the accompanying drawings.

Figure 1:
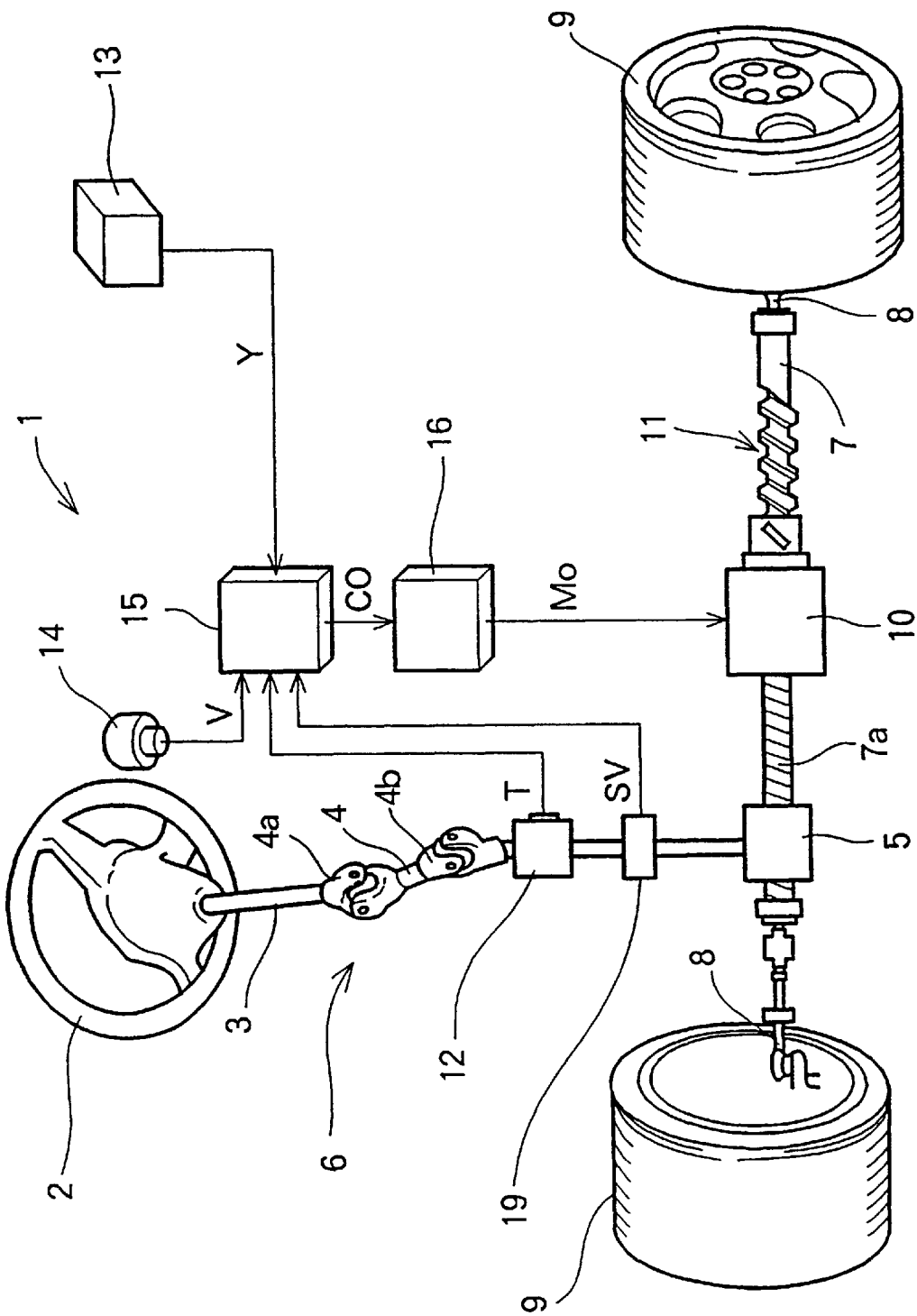
FIG. 1 is a diagrammatical view showing the general construction of an electric power steering apparatus according to the present invention.

Referring now to FIG. 1, there is shown the general construction of an electric power steering apparatus embodying the present invention. The electric power steering apparatus 1 includes a steering wheel 2 firmly connected to one end (upper end) of a steering column or shaft 3, the other end (lower end) of the steering shaft 3 being operatively connected by a connecting shaft 4 having universal couplings 4a, 4b to a variable ratio steering gear mechanism (composed of a variable ratio rack-and-pinion mechanism) 5 contained in a steering gearbox (not shown). These parts 2–5 jointly form a manual steering power generating means or mechanism 6.

The variable ratio steering gear mechanism 5 is designed to provide a greater steering ratio for the first several tens degrees of steering wheel movement in either direction from the straight ahead (neutral) position than for the steering wheel movement near the full left or right (lock) position. The variable ratio steering gear mechanism 5 is well known in the art as disclosed, for example, in Japanese Patent Laid-open Publication No. HEI 7-323852.

Rotation of the steering wheel 2 is converted into linear reciprocation of a rack shaft 7 via the rack-and-pinion mechanism (variable ratio steering gear mechanism) 5. The rack shaft 7 has a rack 7a of gear teeth which forms one part of the rack-and-pinion mechanism 5, the rack 7a being in mesh with a pinion (not shown) of the rack-and-pinion mechanism 5. The opposite ends of the rack shaft 7 are connected by tie rods 8, 8 to steerable left and right front wheels 9, 9 of a vehicle. Thus, by turning the steering wheel 2, the front wheels 9, 9 are pivoted or steered via the rack-and-pinion manual steering power generating mechanism 6 to change the direction of the vehicle.

To lighten the driver's effort needed to turn the steering wheel 2, an electric motor 10 is mounted concentrically with the rack shaft 7 so as to apply a steering assist force or torque to the rack shaft 7 via a ball-screw mechanism (often referred to as "ball-nut mechanism") 11. The ball-screw mechanism 11 is composed of a helical screw (not designated) threaded in an outer peripheral surface of the rack shaft 7, and a nut (not designated) integral with a rotor of the electric motor 10 and held in mesh with the screw with recirculating balls disposed between the screw and the nut. The ball-screw mechanism 11 converts rotational force (assist torque) of the electric motor 10 into a axial thrust force directly acting on the rack shaft 7.

A steering torque sensor 12 and a steering speed sensor 19 are disposed in the steering gear box (not shown). The steering torque sensor 12 detects a steering torque applied by turning the steering wheel 2 and generates a steering torque signal T corresponding to the detected steering torque. The steering speed sensor 19 detects a steering speed corresponding to a speed of rotation of the steering shaft 3 and generates a steering speed signal SV corresponding to the detected steering speed. The steering torque signal T and the steering speed signal SV are supplied to a control unit 15.

A behavior sensor 13 is provided for detecting a change in the vehicle behavior and generates a vehicle behavior signal Y corresponding to the detected vehicle behavioral change. In the illustrated embodiment, the vehicle behavior is represented by a yaw angular velocity (yaw rate) and the behavior signal Y is a yaw angular velocity (yaw rate) signal.

The steering torque sensor 12 is constructed by a resistance wire which converts a torsional displacement or twist corresponding to a torque acting on a torsion bar into an electric resistance. The behavior sensor 13 is a two-dimensional acceleration sensor. The vehicle velocity sensor is formed by a combination of a tone wheel and a coil with permanent magnet. The steering speed sensor 19 is a dc motor such as a tachometer generator.

The torque signal T output from the steering torque sensor 12 represents the magnitude and direction of the steering torque. The yaw rate signal Y output from the behavior sensor 13 represents the rotational direction and speed of yaw angle caused by yawing of the vehicle while in motion. The vehicle velocity signal V output from the vehicle velocity sensor 14 represents the direction (forward or reverse) and speed of vehicle travel. The steering speed signal SV output from the steering speed sensor 19 represents the direction and speed of steering caused by turning the steering wheel 2.

The control unit 15 properly processes the torque signal T supplied from the steering torque sensor 12, the yaw rate signal Y supplied from the behavior sensor 13, the vehicle velocity signal V supplied from the vehicle velocity sensor 14, the steering speed signal SV supplied from the steering speed sensor 19 and a combination thereof to generate a motor control signal (pulse-width modulation "PWM" signal) CO for PWM-driving the electric motor 10 via a motor drive unit 16 (including a bridge circuit composed of four field-effect transistors "FETs") in such a way that the electric motor 10 supplies a steering assist torque well adapted to a forward or a return state of the steering wheel movement corresponding to the vehicle running conditions.

Figure 3:
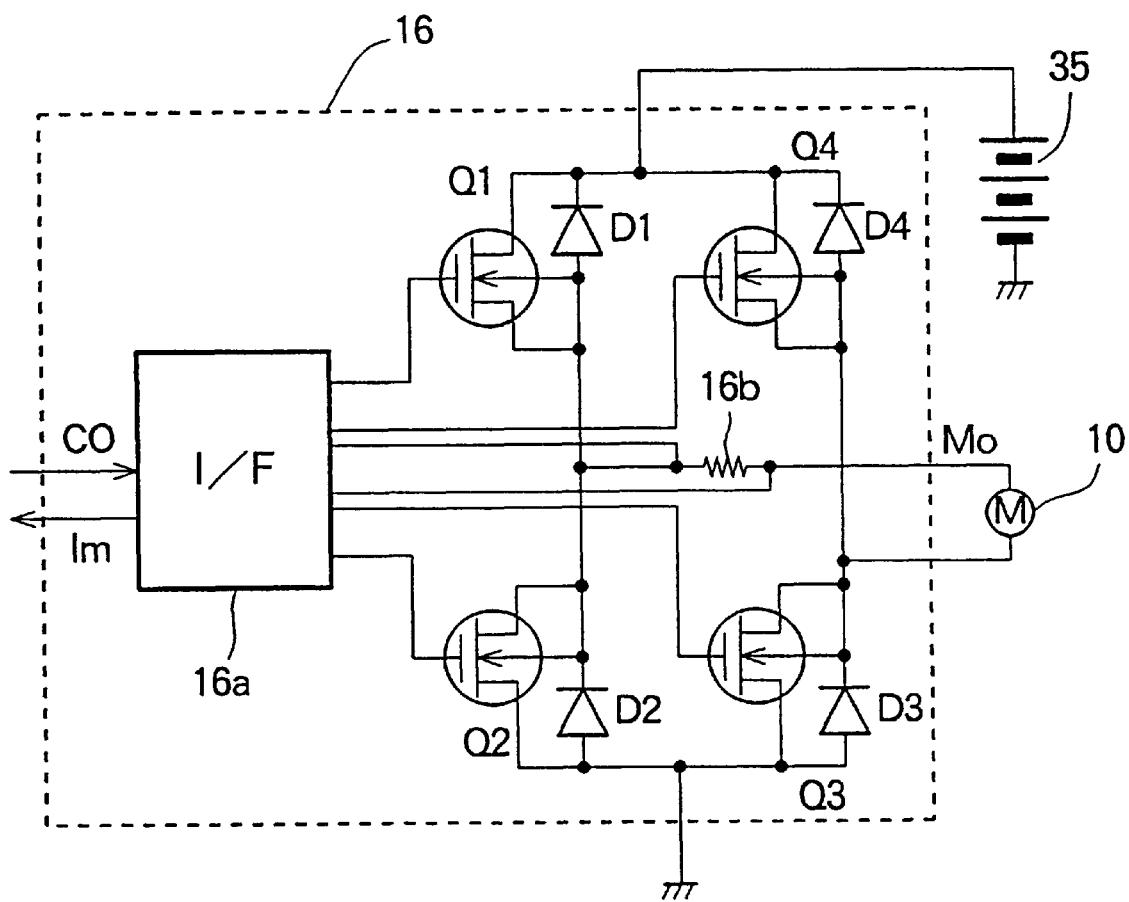
FIG. 3 is a circuit diagram showing a motor drive unit of the electric power steering apparatus.

The motor drive unit 16 includes, as shown in FIG. 3, an interface circuit 16a, a resistance 16b for detecting a motor current, and a bridge circuit consisting of at least four FETs Q1–Q4. The motor drive unit 16 generates, on the basis of the motor control signal CO input into the interface circuit 16a, a motor drive signal Mo for driving the electric motor 10.

The motor control signal CO input into the interface circuit 16a is a combination of a direction signal for controlling the direction of rotation of the electric motor 10 and a PWM signal for controlling drive torque and speed (revolutions per minute "rpm") of the electric motor 10. When the electric motor 10 is to be rotated, for example, in the counterclockwise direction, the FET Q4 is turned on by the directional signal and the gate of the FET Q2 is controlled by the duty ratio of the PWM signal. Conversely, when the electric motor 10 is to be rotated in the clockwise direction, the FET Q1 is turned on and the gate of the FET Q3 is controlled by the duty ratio of the PWM signal. The two FETs Q1 and Q4 and the two FETs Q2 and Q3 may be simultaneously turned on to short-circuit input terminals of the electric motor 10 to thereby apply an electromagnetic braking force to the electric motor 10.

The interface circuit 16a converts the motor current signal detected by the resistance 16b into an analog motor current signal Im through amplification and filtering processes.

Figure 2:
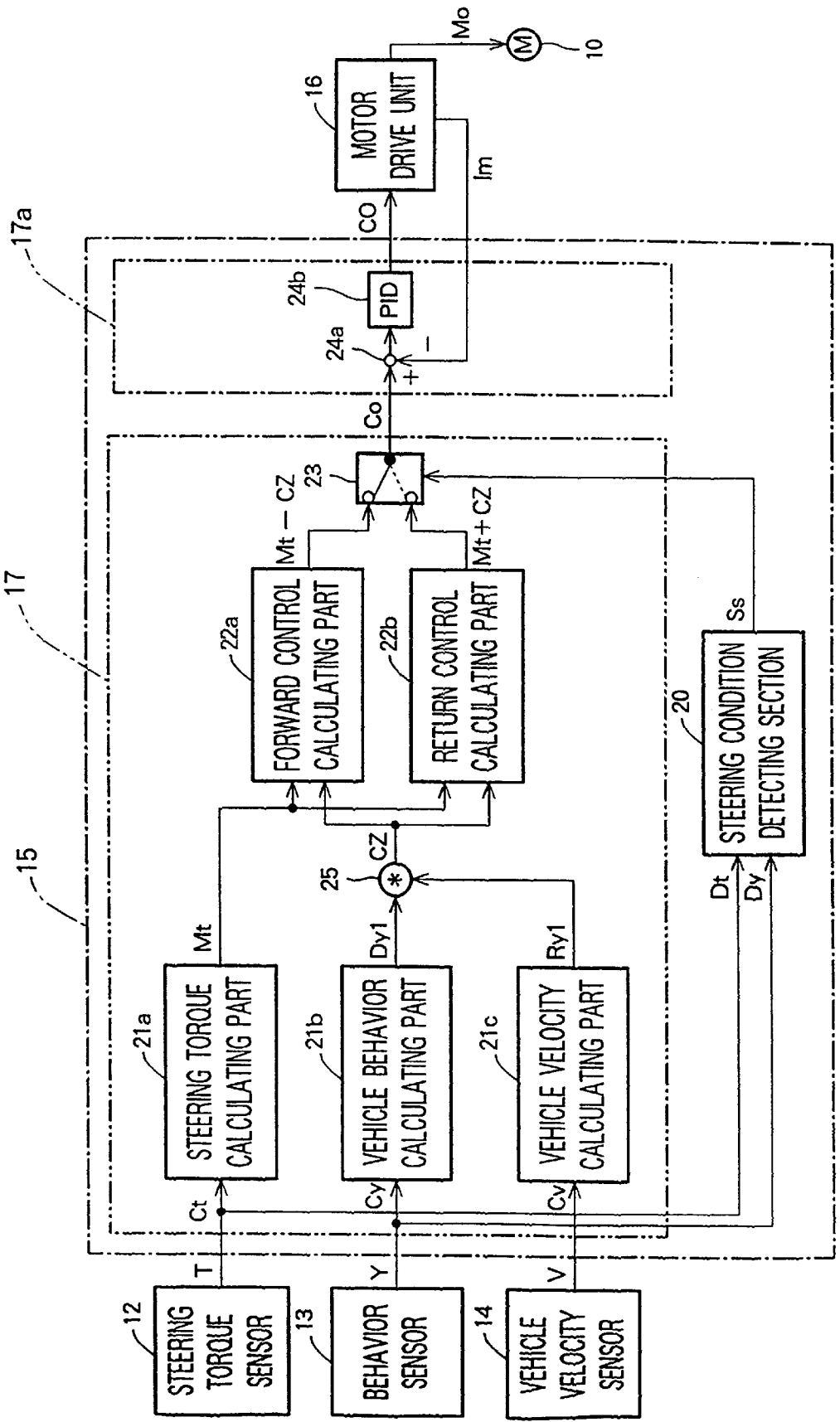
FIG. 2 is a block diagram showing a main portion of the electric power steering apparatus according to a first embodiment of the present invention.

FIG. 2 shows a main portion of a first embodiment of the electric power steering apparatus shown in FIG. 1. The electric power steering apparatus in the illustrated embodiment is featured in that the motor control signal is controlled on the basis of the steering torque T, yaw rate Y and vehicle velocity V. In the illustrated embodiment, the steering speed SV output from the steering speed sensor 19 (FIG. 1) is not used and the steering speed sensor 19 is not shown in FIG. 2.

The control unit 15 is a microprocessor-based electronic control device and includes a motor control section 17, a feedback control section 17a, and a steering condition detecting section 20. The control unit 15 converts the steering torque signal T output from the steering torque sensor 12, the yaw rate signal Y output from the behavior sensor 13 and the vehicle velocity signal V output from the vehicle velocity sensor 14 into a controlled quantity or variable of steering torque signal (hereinafter referred to as "steering torque component") Mt, a controlled quantity or variable of yaw rate signal (hereinafter referred to as "yaw rate component") Dy1 and a controlled quantity or variable of vehicle velocity signal (hereinafter referred to as "vehicle velocity component") Ry1, respectively, on the basis of absolute values of the respective signals T, Y and V.

Additionally, the control unit 15 judges whether the steering wheel movement (or steering operation) is in the forward state (in a direction to steer the front wheels) or in the return state (in a direction toward the straight ahead, neutral position). When the forward state is detected, the control unit 15 subtracts from the steering torque component Mt corresponding to the steering torque signal T, a value CZ corresponding to the product of the yaw rate component Dy1 corresponding to the yaw rate signal Y and the vehicle velocity component Ry1 corresponding to the vehicle velocity signal Y, and supplies the resulting remainder (Mt–CZ) to the feedback control section 17a as a motor control signal Co. Conversely, when the judgment detects the return state, the control unit 15 adds the steering torque component Mt and a value CZ equal to the product of the yaw rate component Dy1 and the vehicle velocity component Ry1, and supplies the resulting sum (Mt+CZ) to the feedback control section 17a as the motor control signal Co.

The feedback control section 17a carries out negative feedback control in which the motor control signal Co is a target value and the detected motor current signal Im fed back from the motor drive unit 16 is used as a controlled quantity. The feedback control section 17a supplies an output signal CO to the motor drive unit 16 in such a sense that the output signal CO will reduce the deviation or offset between the motor control signal (target value) Co and the motor current signal (controlled quantity) Im. The detected motor current signal Im supplied to the feedback control section 17a is subjected to analog-to-digital conversion before the negative feedback control process is performed.

The control unit 15 also includes three analog-to-digital (A/D) converters used for analog-to-digital conversion of respective absolute values of the steering torque signal T, yaw rate signal Y and vehicle velocity signal V, and three direction judgment means or sections (neither shown) used for detection of respective directions of these signals T, Y and V by way of direction flags Dt, Dy and Dv, respectively.

The steering condition detecting section 20 detects the steering wheel being in the forward state or the steering wheel being in the return state on the basis of the respective direction flags Dt, Dy and Dv of the steering torque signal T, yaw rate signal Y and vehicle velocity signal V and supplies a steering condition signal Ss representing the detected steering wheel state to a switching part 23 of the motor control section 17. The steering condition signal Ss may be a high (H) level or a logical one signal when the forward state is detected and a low (L) level or a logical zero signal when the return state is detected.

The foregoing detection of the steering condition is achieved such that the steering wheel is judged to be in the forward state when respective symbols of the direction flag Dt and direction flag Dy match each other (Dt=Dy) and in the return state when respective symbols of the direction flags Dt and Dy do not match (Dt≠Dy). For the above judgment, matching between the direction of the steering torque signal T and the direction of the steering speed signal SV output from the steering speed sensor 19 (FIG. 1) may alternatively be used.

The motor control section includes a steering torque calculating means or part 21a, a vehicle behavior calculating means or part 22b, a vehicle velocity calculating means or part 21c, a forward control calculating means or part 22a, a return control calculating means or part 22b, a multiplier 25 and the switching part 23.

The steering torque calculating part 21a includes a memory such as a read-only memory "ROM" (not shown) which stores therein a table of data, such as shown in FIG. 15, collected in advance either theoretically or experimentally about the steering torque Ct represented by an absolute value of the steering torque signal T output from the steering torque sensor 12 and the steering torque component Mt corresponding to the steering torque Ct. When a steering torque Ct is input from the steering torque sensor 12 in the form of a steering torque signal T, the steering torque calculating part 21a retrieves, from the data table (FIG. 15) stored in the ROM, a steering torque component Mt corresponding to the input steering torque Ct and supplies the retrieved steering torque component Mt to the forward control calculating part 22a and the return control calculating part 22b.

Figure 8:
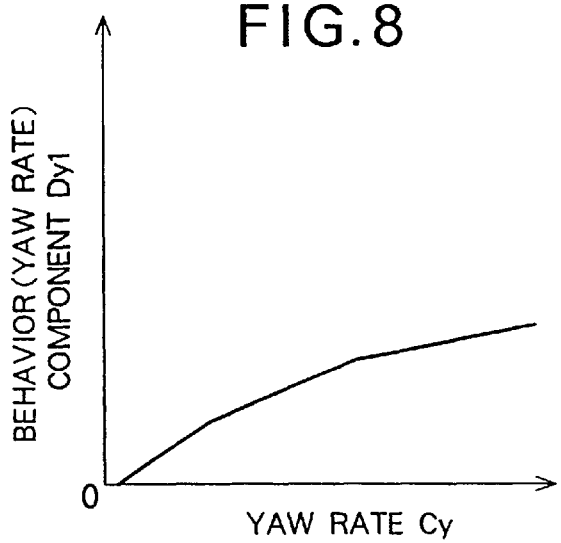
FIG. 8 is a data table showing a correspondence between the yaw rate and the yaw rate component.

The vehicle behavior calculating part 22b includes a memory such as a ROM (not shown) which stores a table of data, such as shown in FIG. 8, collected in advance either theoretically or experimentally about the yaw rate Cy represented by an absolute value of the yaw rate signal Y output from the behavior sensor 13 and the yaw rate component Dy1 corresponding to the yaw rate Cy. When a yaw rate Cy is input from the behavior sensor 13 in the form of a yaw rate signal Y, the vehicle behavior calculating part 22b retrieves, from the data table (FIG. 8) stored in the ROM, a yaw rate component Dy1 corresponding to the input yaw rate Cy and supplies the retrieved yaw rate component Dy1 to the multiplier 25.

Figure 9:
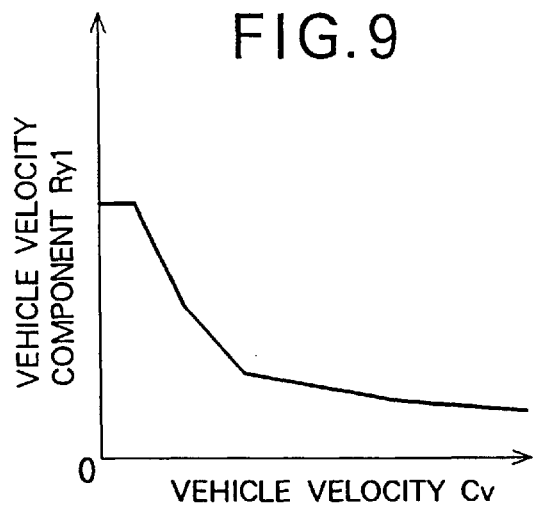
FIG. 9 is a data table showing a correspondence between the vehicle velocity and the vehicle velocity component.

The vehicle velocity calculating part 21c includes an arithmetic and logic unit and a ROM (not shown) which stores a table of data, such as shown in FIG. 9, collected in advance either theoretically or experimentally about the vehicle velocity Cv represented by an absolute value of the vehicle velocity signal V output from the vehicle velocity sensor 14 and the vehicle velocity component Ry1 corresponding to the vehicle velocity Cv. When a vehicle velocity Cv is input from the vehicle velocity sensor 14 in the form of a vehicle velocity signal V, the vehicle velocity calculating part 21c retrieves, from the data table (FIG. 9) stored in the ROM, a vehicle velocity component Ry1 corresponding to the input vehicle velocity Cv and supplies the retrieved vehicle velocity component Ry1 to the multiplier 25. In this instance, the direction of the vehicle speed is indicated by the direction flag Dv.

The multiplier 25 multiplies the yaw rate component Dy1 supplied from the vehicle behavior calculating part 22b with the vehicle velocity component Ry1 supplied from the vehicle velocity calculating part 21c and supplies the resulting product (signal value) CZ to the forward control calculating part 22a and the return control calculating part 22b.

The forward control calculating part 22a is constructed by a memory such as a ROM, a subtractor and so on and subtracts from the steering torque component Mt, a signal value CZ equal to the product of the yaw rate component Dy1 and the vehicle velocity component Ry1 and outputs the resulting remainder (Mt−CZ) as a forward state motor control signal to the switching part 23.

The return control calculating part 22b is constructed by a memory such as a ROM, an adder and so on and adds the steering torque component Mt and a signal value CZ equal to the product of the yaw rate component Dy1 and the vehicle velocity component Ry1 and outputs the resulting sum (Mt+CZ) as a return state motor control signal to the switching part 23.

The switching part 23 has a software-controlled switching function and selects the forward motor control signal (Mt−CZ) when the steering condition signal Ss supplied from the steering condition detecting section 20 is at the high (H) level (logical one signal) and the return motor control signal (Mt+CZ) when the steering condition signal Ss supplied from the steering condition detecting section 20 is at the low (L) level (logical zero signal). The selected motor controlled signal (Mt−CZ) or (Mt+CZ) is output as a motor control signal Co to the feedback control section 17a.

Thus, both in the forward and return states of the steering system, the signal value CZ acts in a direction opposite to the direction of rotation of the steering wheel and thus exerts a damping effect on the rotation of the steering wheel.

The feedback control section 17a includes a subtractor 24a and a PID (proportional plus integral plus derivative) controller 24b. The subtractor 24a calculates a deviation or offset between the motor control signal Co (target value) and the digital value of the detected motor current signal Im. The PID controller 24b consisting of a proportional element P, an integral element I and a derivative element D generates an output signal (motor control signal) CO in such a sense that feedback control is achieved with a small steady state deviation and improved adaptability.

The motor drive unit 16 supplied with the motor control signal CO PWM-controls the bridge circuit consisting of four FETs Q1–Q4 (FIG. 3) to generate a motor drive signal Mo in the form of a PWM drive signal and thereby controllably drives the electric motor 10.

Thus, the control unit 15, when the steering wheel 2 is in the forward state, subtracts from the steering torque component Mt, a value CZ equal to the product between the yaw rate component Dy1 and the vehicle velocity component Ry1 to thereby generate a motor control signal Co (Mt−CZ) acting in the same direction as the direction of rotation of the steering wheel 2. When the steering wheel 2 is in the return state, the control unit 15 adds the steering torque component Mt and a value CZ equal to the product of the yaw rate Y component Dy1 and the vehicle velocity component Ry1 to thereby generate a motor control signal Co (Mt+CZ). The component CZ of the motor control signal Co, which corresponds to the yaw rate Y, acts in a direction opposite to the direction of steering wheel movement. This means that in the forward state of the steering system, the greater the yaw rate Y, the less the steering assist force is supplied from the electric motor 10, while in the return state, the greater the yaw rate Y, the more the steering counter force (force acting in a direction opposite to the direction of rotation of the steering wheel 2) is supplied from the electric motor 10.

The steering torque component Mt is thus corrected by damping it to (or adding to it) the component CZ corresponding to the yaw rate Y (which is a component acting in a direction opposite to the direction of rotation of the steering wheel), such as done by Mt−CZ in the forward state and by Mt+CZ in the return state. This correction is referred to as "damping correction".

With this damping correction, the vehicle behavior component (yaw rate) becomes available for the driver as a steering counter force which acts to diminish the difference or lag between a steering operation taken by the driver and a behavioral change of the vehicle caused by the steering operation. The vehicle can, therefore, be maneuvered smoothly with improved response characteristics.

Figure 4:
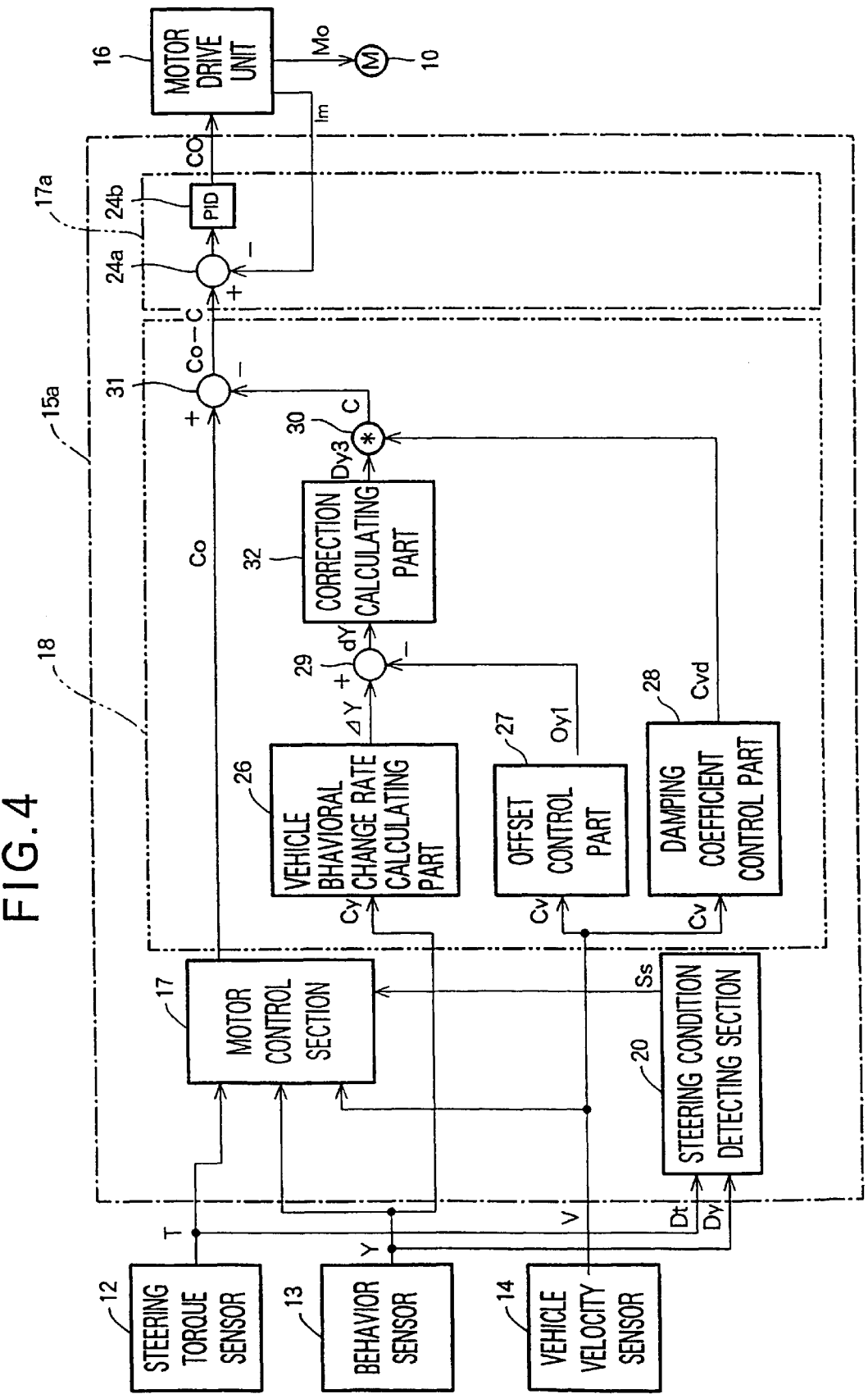
FIG. 4 is a block diagram showing the main portion of an electric power steering apparatus according to a second embodiment of the present invention.

FIG. 4 shows in block diagram a main portion of a second embodiment of the electric power steering apparatus according to the present invention. The electric power steering apparatus is generally constructed such that an output signal generated on the basis of the steering torque, yaw rate and vehicle velocity is corrected using the rate of change of yaw rate so as to control a motor control signal.

As shown in FIG. 4, the electric power steering apparatus generally comprises a steering torque sensor 12, a behavior sensor 13, a vehicle velocity sensor 14, a control unit 15a, a motor drive unit 16 and an electric motor 10. These parts 10, 12–14 and 16 are the same as those described above with respect to the first embodiment shown in FIG. 2, and no further description thereof is therefore needed.

The control unit 15a is a microprocessor-based electronic control device and includes a motor control section 17, a feedback control section 17a, a counter force control section 18 and a steering condition detecting section 20. The control unit 15a generates a forward state motor control signal (Mt−CZ) and a return state motor control signal (Mt+CZ) on the basis of the steering torque signal T, yaw rate signal Y and vehicle velocity signal V and outputs these control signals (Mt−CZ) and (Mt+CZ) from the motor control section 17 to the motor drive unit 16 as a motor control signal Co, in the same manner as done in the first embodiment shown in FIG. 2.

Additionally, the control unit 15a differentiates the yaw rate signal Y to obtain the rate of change ΔY of the vehicle behavior (yaw rate), subtracts from the vehicle behavioral (yaw rate) change rate ΔY an offset quantity Oy1 corresponding to the vehicle velocity signal V supplied from the vehicle velocity sensor 14 to thereby obtain a value dY, further subtracts a value C equal to the product of the value dY and a damping coefficient Cvd corresponding to the vehicle velocity V from the motor control signal Co supplied from the motor control section 17, and supplies the resulting value (Co−C) to the motor drive unit 16.

Though not shown but in the same manner as the embodiment shown in FIG. 2, the control unit 15a also includes three analog-to-digital (A/D) converters used for analog-to-digital conversion of respective absolute values of the steering torque signal T, yaw rate signal Y and vehicle velocity signal V, and three direction judgment means or sections used for detection of respective directions of these signals T, Y and V by way of direction flags Dt, Dy and Dv, respectively.

The motor control section 17 includes a steering torque calculating part, a vehicle behavior calculating part, a vehicle velocity calculating part, a forward control calculating part, a return control calculating part, a multiplier, and switching part that are the same as those 21a, 22b, 21c, 22a and 22b, respectively, in the embodiment shown in FIG. 2. Upon detection of the forward state of the steering wheel on the basis of the steering torque signal T, yaw rate signal Y, vehicle velocity signal V and a steering condition signal Ss, the motor control section 17 subtracts from a steering torque component Mt (FIG. 2) corresponding to the steering torque signal T, a value CZ (FIG. 2) equal to the product between a yaw rate component Dy1 (FIG. 2) corresponding to the yaw rate signal Y and a vehicle velocity component Ry1 (FIG. 2) corresponding to the vehicle velocity signal V and outputs the resulting remainder (Mt−CZ) as the motor control signal Co to the counter force control section 18. Conversely, when the motor control section 17 detects the return state of the steering wheel, it adds together the steering torque component Mt and a value CZ equal to the product between the yaw rate component Dy1 and the vehicle velocity component Ry1 and supplies the resulting sum (Mt+CZ) as the motor control signal Co to the counter force control section 18.

The counter force control section 18 includes a vehicle behavioral change rate calculating means or part 26, an offset control means or part 27, a damping coefficient control means or part 28, a correction calculating means or part 32, a multiplier 30 and a subtractor 31. The counter force control section 18 subtracts an offset quantity Oy1 corresponding to the vehicle velocity signal V from the rate of change ΔY of the vehicle behavior (yaw rate) obtained by differentiating the yaw rate signal Y to thereby obtain the remainder dY, further subtracts a value C equal to the product between a correction Dy3 resulting from the remainder dY and a damping coefficient Cvd corresponding to the vehicle velocity signal V from the motor control signal Co supplied from the motor control section 17, and supplies the resulting remainder (Co−C) to the feedback control section 17a.

The vehicle behavioral change rate calculating part 26, including an arithmetic and logic unit and a ROM, differentiates the yaw rate signal Y from the behavior sensor 13 to obtain the rate of change of the yaw rate signal Y, converts the rate of change into an absolute value to calculate the rate of change ΔY of yaw rate (vehicle behavior), and supplies the rate of change ΔY of yaw rate (vehicle behavioral change rate) to the subtractor 29.

Figure 12:
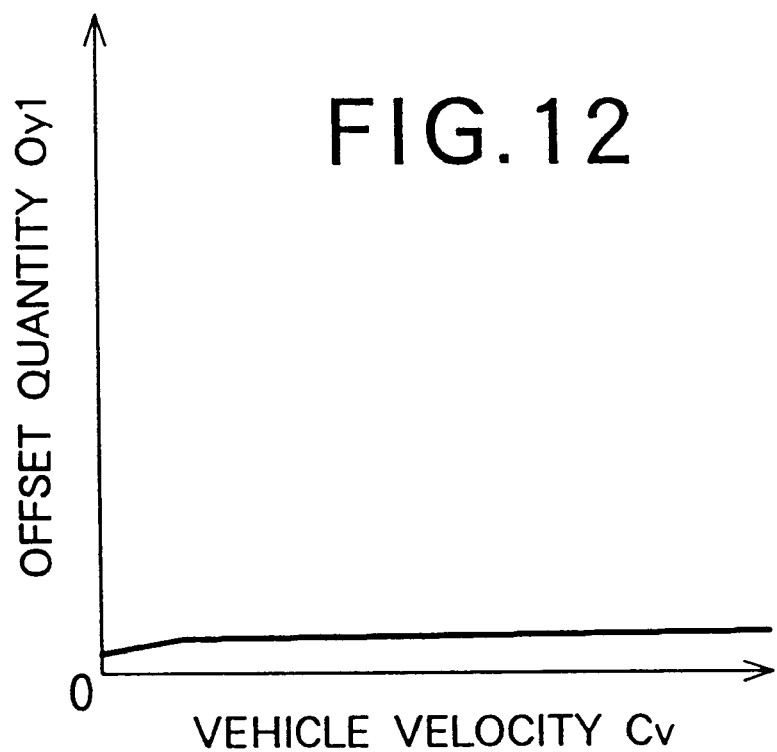
FIG. 12 is a data table showing a correspondence between the vehicle velocity and the offset quantity.

The offset control part 27 includes a memory such as a ROM (not shown) which stores a table of data, such as shown in FIG. 12, collected in advance either theoretically or experimentally about the vehicle velocity Cv and the offset quantity Oy1 corresponding to the vehicle velocity Cv. When a vehicle velocity Cv is input from the vehicle velocity sensor 14, the offset control part 27 retrieves, from the data table (FIG. 12) stored in the ROM, an offset quantity Oy1 corresponding to the input vehicle velocity Cv and supplies the retrieved offset quantity Oy1 to the subtractor 29.

Figure 14:
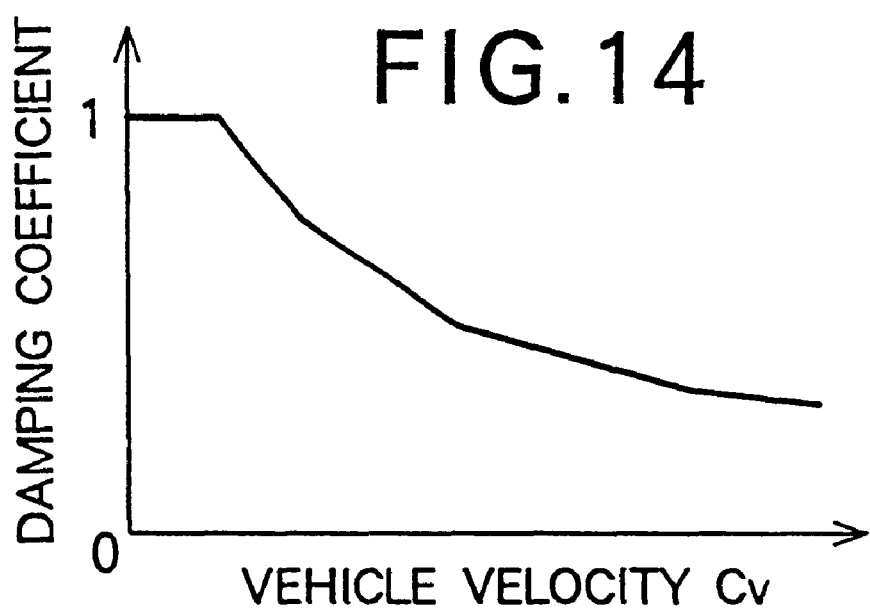
FIG. 14 is a data table showing a correspondence between the vehicle velocity and the damping coefficient.

The damping coefficient control part 28 includes a memory such as a ROM (not shown) which stores a table of data, such as shown in FIG. 14, collected in advance either theoretically or experimentally about the vehicle velocity Cv and the damping coefficient Cvd corresponding to the vehicle velocity Cv. When a vehicle velocity Cv is input from the vehicle velocity sensor 14, the damping coefficient control part 28 retrieves, from the data table (FIG. 14) stored in the ROM, an damping coefficient Cvd corresponding to the input vehicle velocity Cv and supplies the retrieved damping coefficient Cvd to the multiplier 30.

The subtractor 29 subtracts the offset quantity Oy1 (supplied from the offse5t control part 27) from the absolute value ΔY of the rate of change of yaw rate (supplied from the vehicle behavioral change rate calculating part 26) and supplies the resulting remainder dY to the correction calculating part 32.

Figure 13:
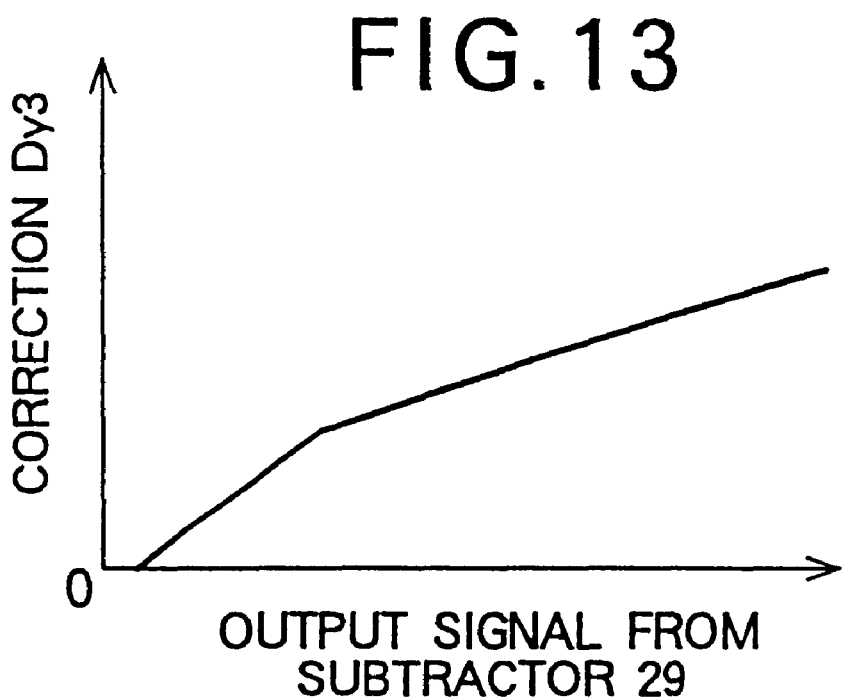
FIG. 13 is a data table showing a correspondence between the output signal from subtractor and the correction.

The correction calculating part 32 includes a memory such as a ROM (not shown) which stores a table of data, such as shown in FIG. 13, collected in advance either theoretically or experimentally about the output signal dY from the subtractor 29 and the correction Dy3 corresponding to the output signal dY. When an output signal dY is input from the subtractor 29, the correction calculating part 32 retrieves, from the data table (FIG. 13) stored in the ROM, a correction Dy3 corresponding to the inputtre output signal dY and supplies the retrieved correction Dy3 to the multiplier 30.

The multiplier 30 multiplies the correction Dy3 (supplied from the correction calculating part 32) with the damping coefficient Cvd (supplied from the damping coefficient control part 26) to thereby obtain the product C and supplies the product C to the subtractor 31.

The subtractor 31 subtracts a signal value (product) C supplied from the multiplier 30 from the motor control signal Co supplied from the motor control section 17 and outputs the resulting remainder (Co−C) as a new or corrected motor control signal to the feedback control section 17a.

The feedback control section 17a and the steering condition detecting section 20 are the same in structure and function as those of the first embodiment described above with reference to FIG. 2 and further description thereof can, therefore, be omitted.

Thus, the control unit 15a adds to or subtracts from a steering torque component Mt corresponding to a steering torque signal T, a value CZ equal to the product between a yaw rate component Ry1 corresponding to a yaw rate signal Y and a vehicle velocity component Ry1 corresponding to a vehicle velocity signal V and outputs, as a motor control signal Co, the resulting sum (Mt+CZ) when the steering wheel is in the return state and the resulting remainder (Mt−CZ) when the steering wheel is in the forward state. Additionally, the control unit 15a subtracts from the motor control signal Co, a value C equal to the product of a damping coefficient Cvd corresponding to the vehicle velocity signal V and a value Dy3 corresponding to a value dY obtained by subtracting an offset quantity Oy1 corresponding to the vehicle velocity signal V from the absolute value ΔY of the rate of change of the yaw rate corresponding to the yaw rate signal Y to thereby obtain a new motor control signal (Co−C). The component CZ of the motor control signal Co, which corresponds to the yaw rate Y, acts in a direction opposite to the direction of steering wheel movement. This means that in the forward state, the greater the yaw rate Y, the less the steering assist force is supplied from the electric motor 10, whereas in the return state, the greater the yaw rate Y, the more the steering counter force (force acting in a direction opposite to the direction of rotation of the steering wheel 2) is supplied from the electric motor 10.

Additionally, in response to a sudden change of yaw rate (yaw angular acceleration), the steering assist force from the electric motor 10 is decreased.

Thus, even in a steering operation taken at substantially the same steering speed as the conventional power steering apparatus, because the vehicle behavioral component is available for the driver as a steering counter force, the front wheels are prevented from becoming oversteered due to the effect of the vehicle behavior and the rate of change of the vehicle behavior (yaw angular velocity and yaw angular acceleration). The difference or lag between the driver's steering operation and the resulting behavioral change of the vehicle can, therefore, be diminished, thereby insuring smooth maneuvers of the vehicle.

Figure 6:
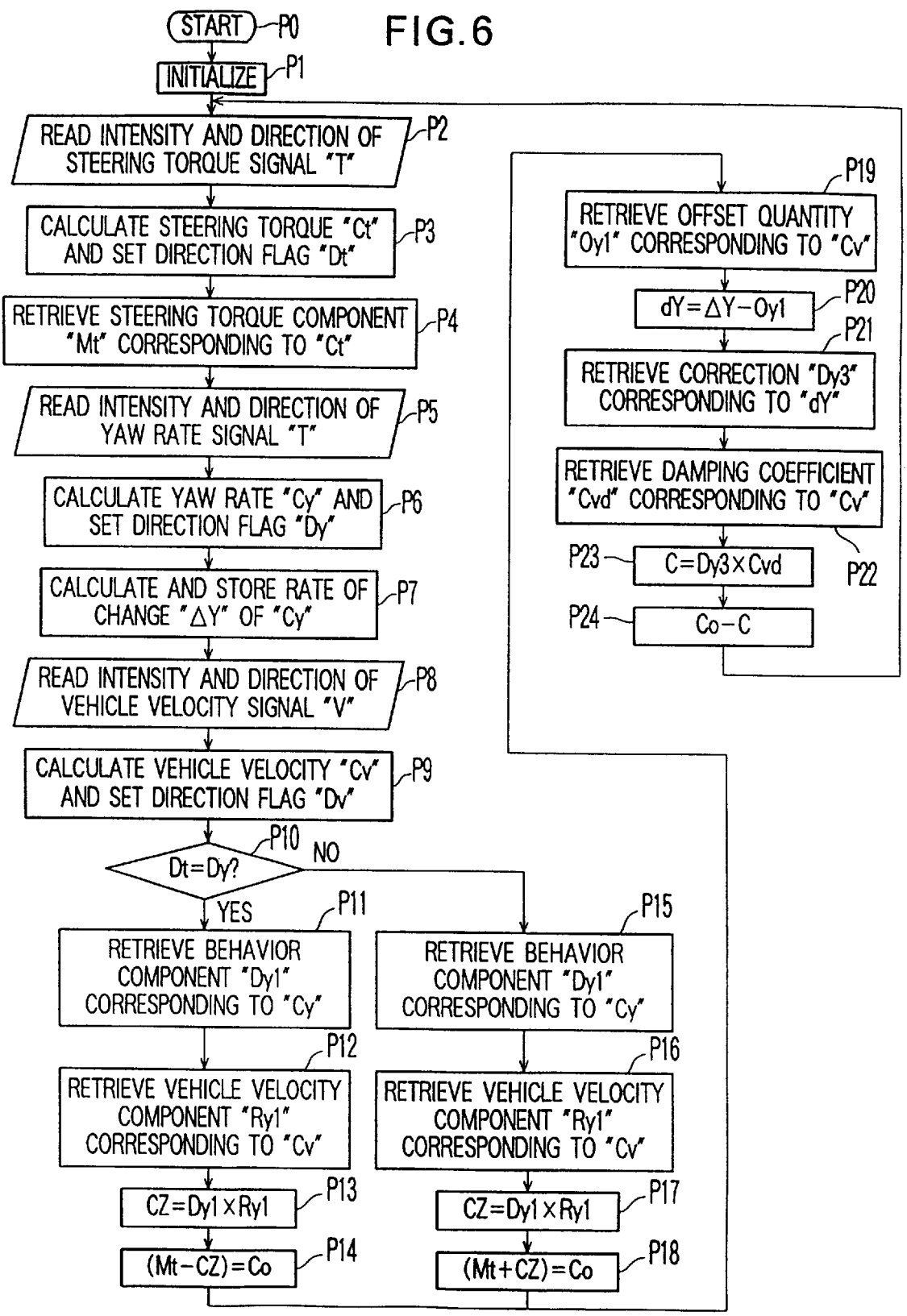
FIG. 6 is a flowchart showing a sequence of operations performed in a control unit of the electric power steering apparatus shown in FIG. 4.

Operation of the control unit 15a of the electric power steering apparatus shown in FIG. 4 will be described with reference to a flowchart shown in FIG. 6.

When an ignition key-switch (not shown) of the vehicle is switched on, the control unit 15a is energized by a battery power source 35 (FIG. 3) to start operation in accordance with a program stored therein (Step P0).

The microprocessor constituting the control unit 15a starts a control routine whereupon a control signal such as a power-on reset signal is sent to various parts to initialize the parts (Step P1).

Then, a step P2 reads the intensity and direction of a steering torque signal T output from the steering torque sensor 12.

Subsequently, a step P3 calculates the intensity and acting direction of the steering torque signal T and converts them into an absolute value Ct and direction flag Dt of the steering torque signal T via an A/D converter. The absolute value Ct and direction flag Dt of the steering torque signal T are stored in the memory.

Thereafter, a step P4 retrieves from the data table (FIG. 15) stored in the ROM of the steering torque calculating part 21a (FIG. 2), a steering torque component Mt corresponding to the steering torque Ct.

Then, a step P5 reads the intensity and direction of a yaw rate signal Y output in the analog form from the behavior sensor 13.

A step P6 calculates the intensity and acting direction of the yaw rate signal Y and coverts them into an absolute value Cy and direction of the yaw rate via an A/D converter. The absolute value Cy and direction flag Dy of the yaw rate are stored in the memory.

Subsequently, a step P7 differentiates the yaw rate Cy to obtains the rate of change of the yaw rate Cy, converts the differentiated yaw rate into an absolute value, and stores the absolute value ΔY of the rate of change of the yaw rate (vehicle behavioral change rate) in the memory.

Thereafter, a step P8 reads the intensity and diredtion of the vehicle velocity signal V output in the analog form from the vehicle velocity sensor 14.

A step P9 calculates the intensity and direction of the vehicle velocity signal V and converts them into an absolute value Cv and direction flag Dv of the vehicle velocity via an A/D converter. The absolute value Cv and direction flag Dv of the vehicle velocity are stored in the memory.

Then, a step P10 instructs the steering condition detecting section 20 to perform comparison between the yaw rate direction flag Dy and the steering torque direction flag Dt and further instructs the switching part 23 to perform, in response to a detection signal Ss from the steering condition detecting section 2, switching of control operation between the case in which the flag Dy and the flag Dt match each other (Dy=Dt), and the case in which the flags Dy and Dt do not match (Dy≠Dt).

When Dy=Dt, the steering system (including the steering wheel) is judged to be in the forward state, and the control procedure goes on to a step P11. Conversely, when Dy≠Dt, the steering system is judged to be in the return state, and the control procedure moves to a step P15.

The step P11 retrieves from the data table (FIG. 8) stored in advance in the memory of the vehicle behavior calculating part 22b, a behavior (yaw rate) component Dy1 corresponding to the absolute value Cy of the yaw rate.

Then, a step P12 retrieves from the data table (FIG. 9) stored in advance in the memory of the vehicle velocity calculating part 21c, a vehicle velocity component Ry1 corresponding to the absolute value Cv of the vehicle velocity.

A step P13 multiplies the yaw rate component Dy1 corresponding to the absolute value Cy of the yaw rate with the vehicle velocity component Ry1 corresponding to the absolute value of the vehicle velocity and sets the resulting product as a signal value CZ.

Thereafter, a step P14 subtracts the signal value CZ obtained by the step P13 from the steering torque component Mt in the memory of the steering torque calculating part 21a and stores the resulting remainder (Mt−CZ) as a Co.

The step P15, which is performed when (Dy≠Dt), retrieves from the data table (FIG. 8) stored in advance in the memory of the vehicle behavior calculating part 22b, a behavior (yaw rate) component Dy1 corresponding to the absolute value Cy of the yaw rate.

Then, a step P16 retrieves from the data table (FIG. 9) stored in advance in the memory of the vehicle velocity calculating part 21c, a vehicle velocity component Ry1 corresponding to the absolute value Cv of the vehicle velocity.

A step P17 multiplies the yaw rate component Dy1 corresponding to the absolute value Cy of the yaw rate with the vehicle velocity component Ry1 corresponding to the absolute value of the vehicle velocity and sets the resulting product as a signal value CZ.

Thereafter, a step P18 adds the steering torque component Mt in the memory of the steering torque calculating part 21a and the signal value CZ obtained at step P17 and stores the resulting sum (Mt+CZ) as a Co.

Subsequently, a step P19 retrieves from the data table (FIG. 12) stored in advance in the memory of the offset control part 27, an offset quantity Oy1 corresponding to the absolute value Cv of the vehicle velocity.

A step P20 retrieves the absolute value ΔY of the rate of change of the yaw rate (vehicle behavioral change rate) from the memory of step P7 and subtracts from it the offset quantity Oy1 retrieved at step P19 (ΔY−Oy1) to thereby obtain dY. When the resulting remainder is negative, dy=0.

Then, a step P21 retrieves from the data table (FIG. 13) stored in advance in the memory of the vehicle behavioral change rate calculating part 26, a correction Dy3 corresponding to the output signal dY from the subtractor 29.

A step P22 retrieves from the data table (FIG.14) stored in advance in the memory of the damping coefficient control part 28, a damping coefficient Cvd for correcting the steering assist torque in correspondence with the absolute value Cv of the vehicle velocity.

Subsequently, a step P23 multiplies the assist torque correction Dy3 retrieved at step P21 in correspondence to the yaw rate change rate dY and the damping coefficient Cvd retrieved at step P22 for the correction of assist torque in correspondence to the vehicle velocity Cv to thereby obtain a new assist torque correction signal C.

Thereafter, a step P24 subtracts the assist torque correction signal C from the resulting value Co output from step P14 in the steering forward state (Dy=Dt) detected at step P10 and from the resulting value Co output from step P18 in the steering return state (Dy≠Dt) detected at step P10 and outputs the resulting remainder (Co−C) as a new motor control signal to the motor drive unit 16.

Figure 5:
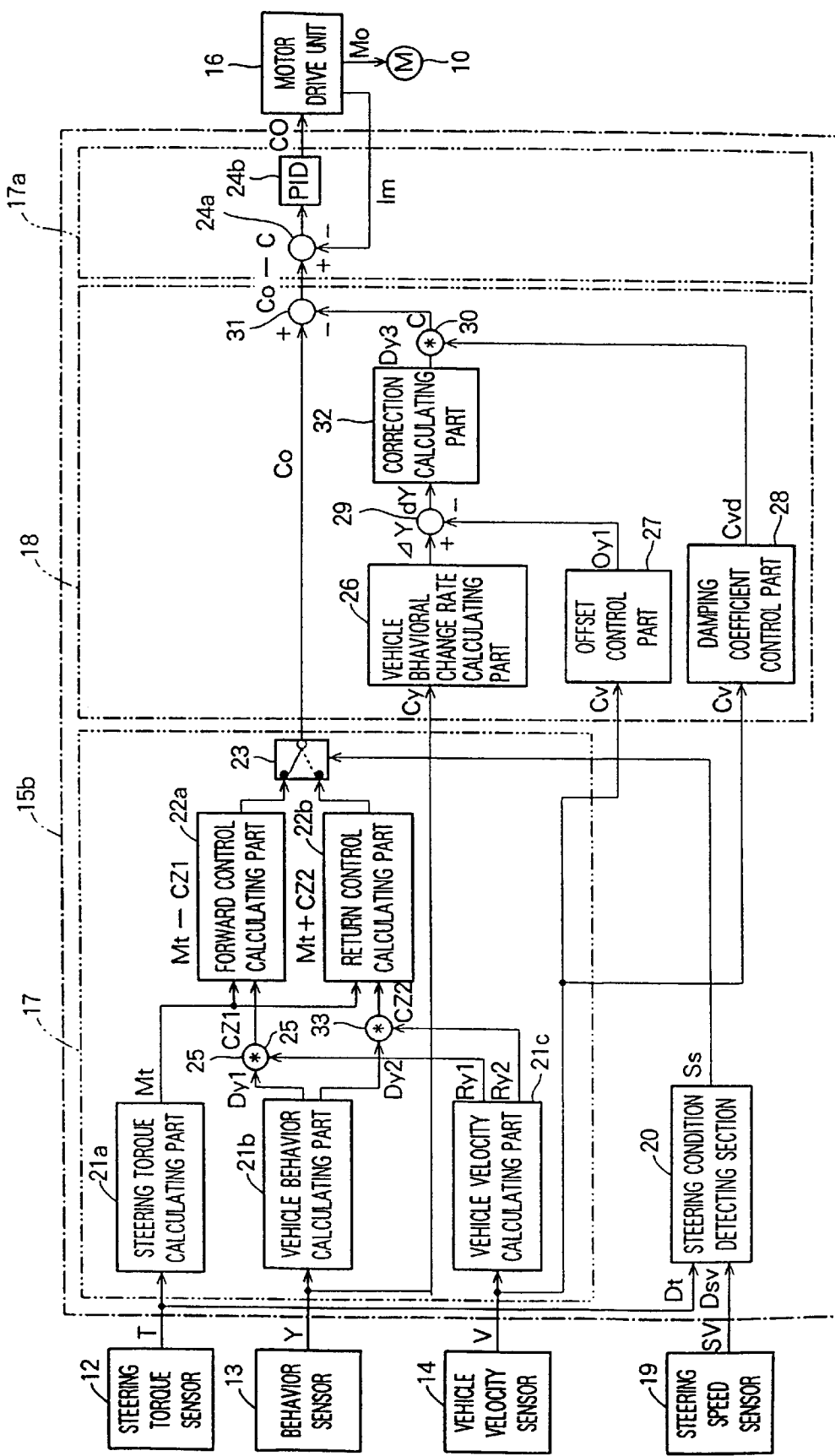
FIG. 5 is a block diagram showing the main portion of an electric power steering apparatus according to a third embodiment of the present invention.

Reference is made to FIG. 5 which shows in block diagram a main portion of a third embodiment of the electric power steering apparatus according to the present invention.

The electric power steering apparatus is generally constructed such that an output signal generated on the basis of the steering torque, yaw rate and vehicle velocity is corrected using the rate of change of yaw rate and the rate of change of vehicle velocity so as to control a motor control signal.

As shown in FIG. 5, the electric power steering apparatus generally comprises a steering torque sensor 12, a behavior sensor 13, a vehicle velocity sensor 14, a steering speed sensor 19, a control unit 15b, a motor drive unit 16 and an electric motor 10. The steering speed sensor 19 detects the direction and speed of steering wheel movement and generates a steering signal SV.

The control unit 15b is a microprocessor-based electronic control device and includes a motor control section 17, a counter force control section 18, a feedback control section 17a, and a steering condition detecting section 20. The control unit 15b converts the steering torque signal T output from the steering torque sensor 12, the yaw rate signal Y output from the behavior sensor 13 and the vehicle velocity signal V output from the vehicle velocity sensor 14 into a steering torque component Mt, yaw rate components Dy1, Dy2 and vehicle velocity components Ry1, Ry2, respectively, on the basis of absolute values of the respective signals T, Y and V.

Additionally, the control unit 15b detects, on the basis of respective directions of the steering torque signal T and steering speed signal SV, whether the steering wheel is in the forward state or in the return state. When the forward state is detected, the control unit 15b subtracts from the steering torque component Mt corresponding to the steering torque signal T, a value CZ1 equal to the product of the yaw rate component Dy1 corresponding to the yaw rate signal Y and the vehicle velocity component Ry1 corresponding to the vehicle velocity signal Y, and supplies the resulting remainder (Mt−CZ1) from the motor control section 17 to the counter force control section 18 as a motor control signal Co. Conversely, when the return state is detected, the control unit 15b adds the steering torque component Mt and a value CZ2 equal to the product of the yaw rate component Dy2 and the vehicle velocity component Ry2, and supplies the resulting sum (Mt+CZ2) from the motor control section 17 to the counter force control section 18 as the motor control signal Co. Additionally, the control unit 15b subtracts from the rate of change ΔY of the vehicle behavior (yaw rate) obtained by differentiating the yaw rate signal Cy from the behavior sensor 13, an offset quantity Oy1 corresponding to the vehicle velocity signal Cv from the vehicle velocity sensor 14 to obtain a value dY, further subtracts from the motor control signal Co supplied from the motor control section 17, a value C equal to the product of the value dY and a damping coefficient Cvd corresponding to the vehicle velocity Cv, and supplies the resulting value (Co−C) to the motor drive unit 16.

Though not shown but in the same manner as the embodiment shown in FIG. 2, the control unit 15b also includes four analog-to-digital (A/D) converters used for analog-to-digital conversion of respective absolute values of the steering torque signal T, yaw rate signal Y, steering speed signal SV and vehicle velocity signal V, and four direction judgment means or sections and for detection of respective directions of the four signals T, Y, SV and V by way of direction flags Dt, Dy, Dsv and Dv, respectively.

The steering condition detecting section 20 detects, on the basis of the direction flag Dt of the steering torque signal T and the direction flag Dsv of the steering speed signal SV, whether the steering wheel is in the forward state or in the return state, and supplies a switching part 23 of the motor control section 17 with a steering condition signal Ss corresponding to the detected steering condition in such a way that the steering condition signal Ss is at a high (H) level or a logical one signal when the forward state is detected and a at a low (L) level or a logical zero signal when the return state is detected.

The foregoing detection of the steering condition is achieved such that the steering wheel is judged to be in the forward state when respective symbols of the direction flag Dt and direction flag Dsv match each other (Dt=Dsv) and in the return state when respective symbols of the direction flags Dt and Dsv do not match (Dt≠Dsv).

The motor control section 17 includes a steering torque calculating part 21a, a vehicle behavior calculating part 22b, a vehicle velocity calculating part 21c, a forward control calculating part 22a, a return control calculating part 22b, two multipliers 25 and 33, and the switching part 23.

The counter force control section 18 includes a vehicle behavioral change rate calculating part 26, an offset control part 27, a damping coefficient control part 28, a correction calculating part 32, a subtractor 29, a multiplier 30 and a subtractor 31.

The steering torque calculating part 21a includes a memory such as a ROM (not shown) which stores therein a table of data, such as shown in FIG. 15, collected in advance either theoretically or experimentally about the steering torque Ct represented by an absolute value of the steering torque signal T output from the steering torque sensor 12 and the steering torque component Mt corresponding to the steering torque Ct. When a steering torque Ct is input from the steering torque sensor 12 in the form of a steering torque signal T, the steering torque calculating part 21a retrieves, from the data table (FIG. 15) stored in the ROM, a steering torque component Mt corresponding to the input steering torque Ct and supplies the retrieved steering torque component Mt to the forward control calculating part 22a and the return control calculating part 22b.

The vehicle behavior calculating part 22b includes a memory such as a ROM (not shown) which stores a table of data for the steering forward state, such as shown in FIG. 8, collected in advance either theoretically or experimentally about the yaw rate Cy represented by an absolute value of the yaw rate signal Y output from the behavior sensor 13 and the yaw rate component Dy1 corresponding to the yaw rate Cy. When a yaw rate Cy is input from the behavior sensor 13 in the form of a yaw rate signal Y, the vehicle behavior calculating part 22b retrieves, from the data table (FIG. 8) stored in the ROM, a yaw rate component Dy1 corresponding to the input yaw rate Cy and supplies the retrieved yaw rate component Dy1 to the multiplier 25.

Figure 10:
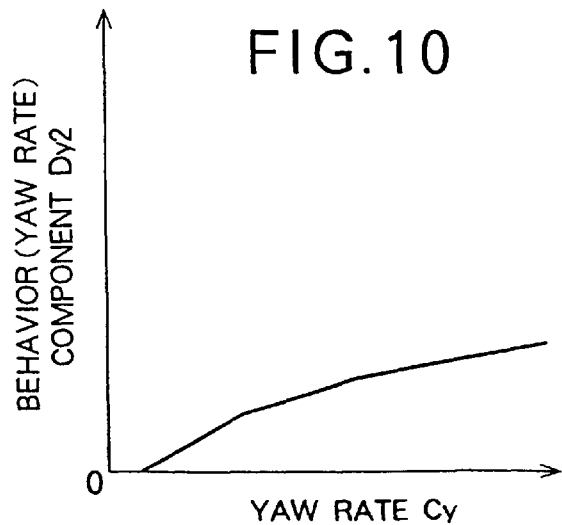
FIG. 10 is a data table showing a correspondence between the yaw rate and the yaw rate component.

The vehicle behavior calculating part 22b further stores in the ROM an additional table of data for the steering return state, such as shown in FIG. 10, collected in advance either theoretically or experimentally about the yaw rate Cy represented by the absolute value of the yaw rate signal Y output from the behavior sensor 13 and the yaw rate component Dy1 corresponding to the yaw rate Cy. When a yaw rate Cy is input from the behavior sensor 13 in the form of a yaw rate signal Y, the vehicle behavior calculating part 22b retrieves, from the data table (FIG. 10) stored in the ROM, a yaw rate component Dy2 corresponding to the input yaw rate Cy and supplies the retrieved yaw rate component Dy2 to the multiplier 33.

The vehicle velocity calculating part 21c includes a memory such as a ROM (not shown) which stores a table of data for the steering forward state, such as shown in FIG. 9, collected in advance either theoretically or experimentally about the vehicle velocity Cv represented by an absolute value of the vehicle velocity signal V output from the vehicle velocity sensor 14 and the vehicle velocity component Ry1 corresponding to the vehicle velocity Cv. When a vehicle velocity Cv is input from the vehicle velocity sensor 14 in the form of a vehicle velocity signal V, the vehicle velocity calculating part 21c retrieves, from the data table (FIG. 9) stored in the ROM, a vehicle velocity component Ry1 corresponding to the input vehicle velocity Cv and supplies the retrieved vehicle velocity component Ry1 to the multiplier 25. In this instance, the direction of the vehicle speed is indicated by the direction flag Dv.

Figure 11:
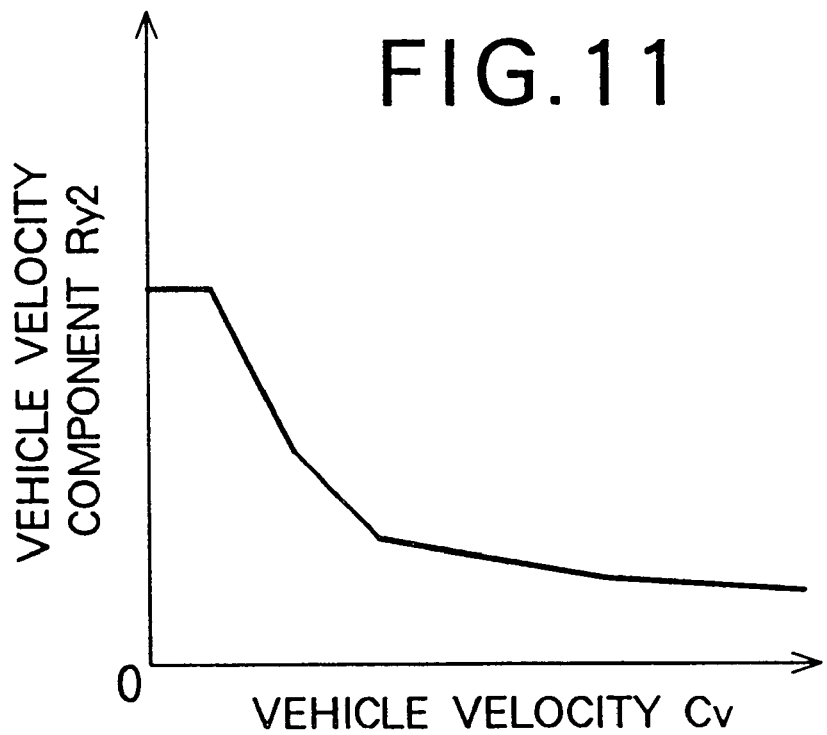
FIG. 11 is a data table showing a correspondence between the vehicle velocity and the vehicle velocity component.

The vehicle velocity calculating part 21c further stores in the ROM an additional table of data for the steering return state, such as shown in FIG. 11, collected in advance either theoretically or experimentally about the vehicle velocity Cv represented by an absolute value of the vehicle velocity signal V output from the vehicle velocity sensor 14 and the vehicle velocity component Ry2 corresponding to the vehicle velocity Cv. When a vehicle velocity Cv is input from the vehicle velocity sensor 14 in the form of a vehicle velocity signal V, the vehicle velocity calculating part 21c retrieves, from the data table (FIG. 11) stored in the ROM, a vehicle velocity component Ry2 corresponding to the input vehicle velocity Cv and supplies the retrieved vehicle velocity component Ry2 to the multiplier 33. The multiplier 25 multiplies the yaw rate component Dy1 supplied from the vehicle behavior calculating part 22b with the vehicle velocity component Ry1 supplied from the vehicle velocity calculating part 21c and supplies the resulting product (signal value) CZ1 to the forward control calculating part 22a.

The multiplier 33 multiplies the yaw rate component Dy2 supplied from the vehicle behavior calculating part 22b with the vehicle velocity component Ry2 supplied from the vehicle velocity calculating part 21c and supplies the resulting product (signal value) CZ2 to the return control calculating part 22b.

The forward control calculating part 22a is constructed by a memory such as a ROM, a subtractor and so on and subtracts from the steering torque component Mt, the product (signal value) CZ1 of the yaw rate component Dy1 and the vehicle velocity component Ry1 and outputs the resulting remainder (Mt−CZ1) as a forward sate motor control signal to the switching part 23.

The return control calculating part 22b is constructed by a memory such as a ROM, an adder and so on and adds the steering torque component Mt and the product (signal value) CZ2 of the yaw rate component Dy2 and the vehicle velocity component Ry2 and outputs the resulting sum (Mt+CZ2) as a return sate motor control signal to the switching part 23.

The switching part 23 has a software-controlled switching function and selects the forward motor control signal (Mt−CZ1) when the steering condition signal Ss supplied from the steering condition detecting section 20 is at the high (H) level (logical one signal) and the return motor control signal (Mt+CZ2) when the steering condition signal Ss supplied from the steering condition detecting section 20 is at the low (L) level (logical zero signal). The selected motor controlled signal (Mt−CZ1) or (Mt+CZ2) is output as a motor control signal Co to the subtractor 31 of the counter force control section 18.

The vehicle behavioral change rate calculating part 26, including an arithmetic and logic unit and a ROM, differentiates the yaw rate signal Y from the behavior sensor 13 to obtain the rate of change of the yaw rate signal Y, converts the rate of change into an absolute value to calculate the rate of change ΔY of yaw rate (vehicle behavior), and supplies the rate of change ΔY of yaw rate (vehicle behavioral change rate) to the subtractor 29.

The offset control part 27 includes a memory such as a ROM (not shown) which stores a table of data, such as shown in FIG. 12, collected in advance either theoretically or experimentally about the vehicle velocity Cv and the offset quantity Oy1 corresponding to the vehicle velocity Cv. When a vehicle velocity Cv is input from the vehicle velocity sensor 14, the offset control part 27 retrieves, from the data table (FIG. 12) stored in the ROM, an offset quantity Oy1 corresponding to the input vehicle velocity Cv and supplies the retrieved offset quantity Oy1 to the subtractor 29.

The damping coefficient control part 28 includes a memory such as a ROM (not shown) which stores a table of data, such as shown in FIG. 14, collected in advance either theoretically or experimentally about the vehicle velocity Cv and the damping coefficient Cvd corresponding to the vehicle velocity Cv. When a vehicle velocity Cv is input from the vehicle velocity sensor 14, the damping coefficient control part 28 retrieves, from the data table (FIG. 14) stored in the ROM, an damping coefficient Cvd corresponding to the input vehicle velocity Cv and supplies the retrieved damping coefficient Cvd to the multiplier 30.

The subtractor 29 subtracts the offset quantity Oy1 (supplied from the offse5t control part 27) from the absolute value ΔY of the rate of change of yaw rate (supplied from the vehicle behavioral change rate calculating part 26) to obtain a value dY and supplies this value dY to the correction calculating part 32.

The correction calculating part 32 includes a memory such as a ROM (not shown) which stores a table of data, such as shown in FIG. 13, collected in advance either theoretically or experimentally about the output signal dY from the subtractor and the correction Dy3 corresponding to the output signal dY. When an output signal dY is input from the subtractor 29, the correction calculating part 32 retrieves, from the data table (FIG. 13) stored in the ROM, a correction Dy3 corresponding to the input output signal dY and supplies the retrieved correction Dy3 to the multiplier 30.

The multiplier 30 multiplies the correction Dy3 (supplied from the correction calculating part 32) with the damping coefficient Cvd (supplied from the damping coefficient control part 26) and supplies the resulting product C to the subtractor 31.

The subtractor 31 subtracts a signal value (product) C supplied from the multiplier 30 from the motor control signal Co supplied from the motor control section 17 and outputs the resulting remainder (Co−C) as a new or corrected motor control signal to the feedback control section 17a.

The feedback control section 17a and the steering condition detecting section 20 are the same in structure and function as those of the first embodiment described above with reference to FIG. 2 and further description thereof can, therefore, be omitted.

Thus, the control unit 15b, when the steering wheel 2 is in the forward state, subtracts from the steering torque component Mt corresponding to the steering torque signal T, a value CZ1 equal to the product of the yaw rate component Dy1 corresponding to the yaw rate and the vehicle velocity component Ry1 corresponding to the vehicle velocity, and outputs the resulting remainder (Mt−CZ1) as a motor control signal Co. On the other hand, when the steering wheel 2 is in the return state, the control unit 15b adds the steering torque component Mt and a value CZ2 equal to the product of the yaw rate component Dy2 and the vehicle velocity component Ry2, and outputs the resulting sum (Mt+CZ2) as the motor control signal Co. Additionally, the control unit 15b subtracts from the motor control signal Co, a value C equal to the product of a damping coefficient Cvd corresponding to the vehicle velocity signal Cv and a value Dy3 corresponding to a value dY obtained by subtracting an offset quantity Oy1 corresponding to the vehicle velocity signal Cv from the absolute value ΔY of the rate of change of the yaw rate corresponding to the yaw rate signal Y to thereby obtain a new motor control signal (Co−C). Both in the steering forward state and in the steering return state, the damping correction is achieved in the opposite direction of the steering wheel movement. Accordingly, the steering assist force from the electric motor 10 is decreased when the yaw rate is suddenly changed.

Figure 7:
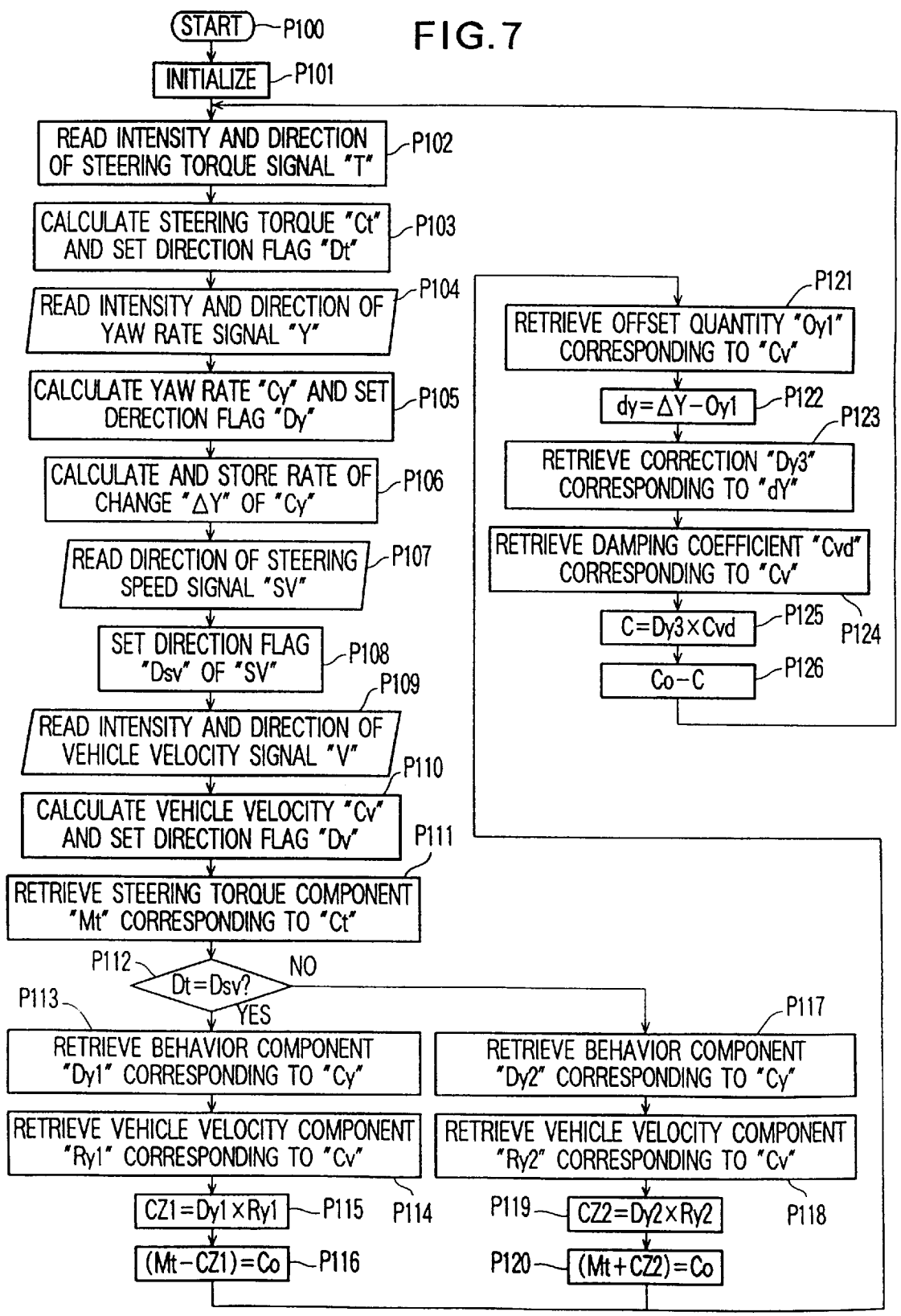
FIG. 7 is a flowchart showing a sequence of operations performed in a control unit of the electric power steering apparatus shown in FIG. 5.

Operation of the control unit 15b of the electric power steering apparatus shown in FIG. 5 will be described with reference to a flowchart shown in FIG. 7.

When the ignition key-switch (not shown) of the vehicle is switched on, the control unit 15b is energized by the battery power source 35 (FIG. 3) to start operation in accordance with a program stored therein (Step P100).

The microprocessor constituting the control unit 15b starts a control routine whereupon a control signal such as a power-on reset signal is sent to various parts to initialize the parts (Step P101).

Then, a step P102 reads the intensity and direction of an analog steering torque signal T output from the steering torque sensor 12.

Subsequently, a step P103 calculates the intensity and acting direction of the steering torque signal T and converts them into an absolute value Ct and direction flag Dt of the steering torque signal T via an A/D converter. The absolute value Ct and direction flag Dt of the steering torque signal T are stored in the memory.

Thereafter, a step P104 reads the intensity and direction of a yaw rate signal Y output in the analog form from the behavior sensor 13.

A step P105 calculates the intensity and acting direction of the yaw rate signal Y and coverts them into an absolute value Cy and direction of the yaw rate via an A/D converter. The absolute value Cy and direction flag Dy of the yaw rate are stored in the memory.

Subsequently, a step P106 differentiates the yaw rate Cy to obtains the rate of change of the yaw rate Cy, converts the differentiated yaw rate into an absolute value, and stores the absolute value ΔY of the rate of change of the yaw rate (vehicle behavioral change rate) in the memory.

A step 107 reads the direction and intensity of an analog steering speed signal SV output from the steering speed sensor 19.

Then, a step 108 calculates the acting direction of the steering speed and converts it into a direction flag Dsv via an A/D converter. The direction flag Dsv is stored in the memory.

Subsequently, a step 109 reads the intensity and direction of an analog vehicle velocity signal V output from the vehicle velocity sensor 14.

A step 110 calculates the intensity and direction of the vehicle velocity and converts them into the vehicle velocity Cv and the direction flag Dv of vehicle velocity. The vehicle velocity Cv and direction flag Dv are stored in the memory.

A step 111 retrieves from the data table (FIG. 15) stored in the ROM of the steering torque calculating part 21a (FIG. 2), a steering torque component Mt corresponding to the steering torque Ct.

Then, a step P112 instructs the steering condition detecting section 20 to perform comparison between the steering speed direction Dsv and the steering torque direction flag Dt and further instructs the switching part 23 to perform, in response to a detection signal Ss from the steering condition detecting section 20, switching of control operation between the case in which the flag Dsv and the flag Dt match each other (Dsv=Dt), and the case in which the flags Dsv and Dt do not match (Dsv≠Dt).

When Dsv=Dt, the steering system (including the steering wheel) is judged to be in the forward state, and the control procedure goes on to a step P113. Conversely, when Dy≠Dt, the steering system is judged to be in the return state, and the control procedure moves to a step P117.

The step P113 retrieves from the data table (FIG. 8) stored in advance in the memory of the vehicle behavior calculating part 22b, a behavior (yaw rate) component Dy1 corresponding to the absolute value Cy of the yaw rate.

Then, a step P114 retrieves from the data table (FIG. 9) stored in advance in the memory of the vehicle velocity calculating part 21c, a vehicle velocity component Ry1 corresponding to the absolute value Cv of the vehicle velocity.

A step P115 multiplies the yaw rate component Dy1 corresponding to the absolute value Cy of the yaw rate with the vehicle velocity component Ry1 corresponding to the absolute value Cv of the vehicle velocity and sets the resulting product as a signal value CZ1.

Thereafter, a step P116 subtracts the signal value CZ1 obtained by the step P115 from the steering torque component Mt obtained at step and stores the resulting remainder (Mt−CZ1) as a Co.

The step P117, which is performed when (Dsv≠Dt), retrieves from the data table (FIG. 10) stored in advance in the memory of the vehicle behavior calculating part 22b, a behavior (yaw rate) component Dy2 corresponding to the absolute value Cy of the yaw rate.

Then, a step P118 retrieves from the data table (FIG. 11) stored in advance in the memory of the vehicle velocity calculating part 21c, a vehicle velocity component Ry2 corresponding to the absolute value Cv of the vehicle velocity.

A step P119 multiplies the yaw rate component Dy2 corresponding to the absolute value Cy of the yaw rate with the vehicle velocity component Ry2 corresponding to the absolute value Cv of the vehicle velocity and sets the resulting product as a signal value CZ2.

Thereafter, a step P120 adds the steering torque component Mt obtained at step P111 and the signal value CZ2 obtained by the step P119 and stores the resulting sum (Mt+CZ2) as a Co.

Subsequently, with respect to each of the output values Co in the steering forward and return states (Dsv=Dt) and (Dsv≠Dt) obtained at step 112, a step P121 retrieves from the data table (FIG. 12) stored in advance in the memory of the offset control part 27, an offset quantity Oy1 corresponding to the absolute value Cv of the vehicle velocity.

A step P122 retrieves the absolute value ΔY of the rate of change of the yaw rate (vehicle behavioral change rate) from the memory at step P106 and subtracts from it the offset quantity Oy1 retrieved at step P121 (ΔY−Oy1) to obtain a value dY. When the resulting remainder is negative, dy=0.

Then, a step P123 retrieves from the data table (FIG. 13) stored in advance in the memory of the vehicle behavioral change rate calculating part 26, a correction Dy3 corresponding to the output signal dY from the subtractor 29.

A step P124 retrieves from the data table (FIG.14) stored in advance in the memory of the damping coefficient control part 28, a damping coefficient Cvd for correcting the steering assist torque in correspondence with the absolute value Cv of the vehicle velocity.

Subsequently, a step P125 multiplies the assist torque correction Dy3 retrieved at step P123 in correspondence to the rate of change dY of yaw rate and the damping coefficient Cvd retrieved at step P124 for the correction of assist torque in correspondence to the vehicle velocity Cv to thereby obtain a new assist torque correction signal C.

Thereafter, a step P126 subtracts the assist torque correction signal C obtained at step 125 from the value (motor control signal) Co output from step P116 and from the value Co output from step P120 and outputs the resulting remainder (CoC) as a new motor control signal to the motor drive unit 16.

Since the sensitivity of vehicle behavior responsive to changes in the vehicle speed and the steering counter force responsive to changes of vehicle behavior are provided to the driver, steering operation is performed smoothly throughout a prescribed range of vehicle velocity without causing a lag between the manual steering operation and the vehicle behavior response.

Obviously, various minor changes and modifications of the present invention are possible in the light of the above teaching. It is to be understood that within the scope of the appended claims the present invention may be practiced otherwise than as specifically described.

What is claimed is:

1. An electric power steering apparatus for a vehicle including a variable ratio steering gear mechanism, comprising:

an electric motor applying a steering assist torque to a steering system of the vehicle;

a steering torque sensor detecting a steering torque of said steering system and generating a steering torque signal corresponding to the detected steering torque;

a behavior sensor detecting a yaw angular velocity of the vehicle and generating a yaw rate signal corresponding to the detected vehicle yaw rate;

a control unit controlling operation of said electric motor on the basis of at least the steering torque, said control unit including a steering torque calculating part outputting a steering torque component corresponding to the steering torque signal output from said steering torque sensor, and a vehicle behavior calculating part outputting a yaw rate component corresponding to the yaw rate signal output from said behavior sensor, said control unit correcting said steering torque component by damping it with said yaw rate component including subtracting a first value based on said yaw rate component from said steering torque component thereby suppressing oversteer when the steering system is in a forward state;

a motor drive unit driving said motor on the basis of an output signal from said control unit;

a vehicle velocity sensor detecting a velocity of the vehicle and generating a vehicle velocity signal corresponding to the detected velocity of the vehicle, wherein said control unit further includes:
- a vehicle velocity calculating part outputting a vehicle velocity component corresponding to the vehicle velocity signal output from said vehicle velocity sensor, and
- a steering condition detecting section detecting a forward state and a return state of the steering system, and wherein said control unit corrects said steering torque component by subtracting from said steering torque component said first value determined on the basis of said yaw rate component and said vehicle velocity component when the forward state is detected by said steering condition detecting section and by adding said steering torque component and a second value determined on the basis of said yaw rate component and said vehicle velocity component when the return state is detected by said steering condition detecting section.

\* \* \* \* \*